United States Patent [19]

Shinohara et al.

[11] 4,085,334
[45] Apr. 18, 1978

[54] ELECTRONIC SYSTEM FOR PROCESS INSTRUMENTATION AND CONTROL

[75] Inventors: Katsuhiko Shinohara; Yoshinori Kuramochi; Tetsuo Suehiro; Ichiro Matsubara, all of Katsuta, Japan

[73] Assignee: Hitachi, Ltd., Japan

[21] Appl. No.: 620,759

[22] Filed: Oct. 8, 1975

[30] Foreign Application Priority Data
Oct. 9, 1974  Japan ............................ 49-115500

[51] Int. Cl.² ............................................ H02M 7/20
[52] U.S. Cl. .................................. 307/11; 307/30; 307/151; 318/609
[58] Field of Search ................. 307/11, 151, 30, 12, 307/1, 4, 5, 17; 318/596, 609, 610; 317/262 A

[56] References Cited

U.S. PATENT DOCUMENTS

| | | | |
|---|---|---|---|
| 3,461,310 | 8/1969 | Pintell | 307/11 |
| 3,566,241 | 2/1971 | Ross | 318/610 |
| 3,763,410 | 10/1973 | Phillips | 317/262 A |
| 3,938,025 | 2/1976 | Gustafsson | 307/4 |

Primary Examiner—B. Dobeck
Attorney, Agent, or Firm—Craig & Antonelli

[57] ABSTRACT

An electronic system for process instrumentation and control or a power supply system with a high reliability. In a plurality of instrumentation and control systems each including a plurality of measuring instruments and apparatus connected to a common DC power supply, a DC voltage is supplied to the plurality of instruments and apparatus from the DC power supply, through a current limiter and an apparatus having a DC-wise insulating function which are provided for each of the instrumentation and control systems.

39 Claims, 11 Drawing Figures

ELECTRONIC SYSTEM FOR PROCESS INSTRUMENTATION AND CONTROL

BACKGROUND OF THE INVENTION

1. Field of the Invention

This invention relates to an electronic system for process instrumentation and control or more in particular to a power supply system with a high reliability.

2. Description of the Prior Art

In this specification, the electronic system for process instrumentation and control is indicative of a system whereby process variables are measured or controlled electronically.

A process variable such as a flow rate is converted into a DC current signal of 4 to 20 mA for transmission. This current signal is applied to an input converter where it is converted into a DC voltage signal of 1 to 5 V suitable for an input to a measuring instrument connected in a subsequent stage. In the case where a process variable is a flow rate and a differential pressure transmitter is used as a detector, a rooter amplifier is employed as the instrument arranged in a stage subsequent to the input converter. In response to the output of the input converter, the rooter amplifier produces a voltage signal proportional to the process variable. A rooter amplifier, as defined in the "Electronics and Nucleonics Dictionary" published by the McGraw-Hill Publishing Company is a non-linear amplifier in which negative feedback is used to make the output voltage vary as the square root or some other root of the input voltage. The voltage signal, having been processed by the rooter amplifier, is applied to a PID controller. The PID controller determines a difference (a deviation) between an input signal thereto and a set signal and produces the result of the PID (proportional plus integral plus derivative) operation. The output of BID controller is converted into a DC actuation signal of 4 to 20 mA by an output converter, thus causing an actuator to open and close a valve. For the purpose of integration, the signal from the rooter amplifier is applied to an integrator in parallel to the PID controller, so that the result of integrating operation effected in the integrator is indicated by a counter or the like.

Power is supplied to the input and output converters and operational elements or operators from a stabilized DC power source which rectifies and stabilizes a commercial power source to provide a DC source voltage of 24 V. The reason for supplying power not directly from a commercial power source but through the stabilized DC power source is to eliminate ill effects due to possible frequency and voltage fluctuation of the power source, to suppress noise from the power source and to facilitate a power back-up during power failure.

On the other hand, there are a number of methods for supplying DC power to the units of the electronic system for process instrumentation and control including, in the case under consideration, the rooter amplifier, PID controller, integrator and output converter. One method is the direct power supply method in which the DC power supply is used directly as a power source for the circuits. The other method is the insulated power supply method in which DC power is subjected to DC-DC conversion and is then fed to power supply terminals of each unit through a transformer.

The disadvantage of the direct power supply method is that a trouble in an instrumentation and control system has an adverse effect on another instrumentation and control system through the power line due to direct connection of a plurality of instrumentation and control systems to the same power supply. For example, in the event that an abnormally high voltage makes its way into a first instrumentation and control system through connection of the transmitter or actuator therewith, by induction or contact with a high voltage, the circuit elements in each unit of the first instrumentation and control system may be damaged, or continuous application of abnormally high voltages results in the same effect as of successive occurrence of noise. This gives rise to erroneous operation, deteriorating the control characteristics. Not only that, the abnormal voltage is undesirably led to a second instrumentation and control system through voltage lines, thus damaging or deteriorating the control characteristics of the circuit elements in each unit of the second instrumentation and control system. Also, if the power supply is short-circuited in a given unit of the first instrumentation and control system, an excess current protection circuit in the stabilized DC power source is actuated, with the result that power to the second instrumentation and control system is cut off, thus rendering the same inoperative.

A method often employed to prevent this inconvenience is to insert a fuse in a power lead-in terminal of each unit, which fuse is adapted to burn out in response to the short-circuiting in the power supply. This method, however, greatly undermines the safety of the objects of control. In ordinary plant operation the direction in which the actuator is closed or opened is selected in such a manner as to orient the plant operation in a safe direction at the time of power failure. In other words, the actuator is operated in a safe direction when the signal to the actuator, namely, the output signal of the output converter is zero. This output signal in a safe direction is incapable of being produced in response to the burning out of any of the fuses inserted in the power circuits of the respective units of an instrumentation and control system. In the aforementioned case involving a flow rate as a process variable, for example, the burning out of the fuse of the output converter renders the output thereof zero, thus directing the plant operation in a safe mode. In the case where one of the fuses inserted in the power circuits of the input converter, the rooter amplifier and the PID controller burns out with the output converter operative, however, it is impossible to orient the output of the output converter in the safe direction.

This shortcoming of the direct supply method is even more aggravated from the viewpoint of safety of the plant operation when the number of instrumentation and control systems deriving power from a single stabilized DC power supply reaches as large as several tens of loops.

In the insulated power supply method in which a DC-DC converter with a transformer is provided at the power supply terminals of each unit and an insulated power supply is used as a circuit power source, by contrast, the effect of a trouble of one instrumentation and control system on another accompanying the above-mentioned direct power supply method is eliminated by the transformer of the DC-DC converter. In spite of this, the disadvantage remains unresolved that the aforementioned actuator terminal cannot be oriented in the safe direction in the event of a power failure caused by the burning out of the fuse in such units as the input converter and the PID controller or a fault of the DC-DC converter. Further, the fact that each unit must be provided with a DC-DC converter leads to a complicated circuit configuration as well as to a high cost.

SUMMARY OF THE INVENTION

The present invention has been made to overcome the disadvantages encountered with the conventional direct power supply method or the insulated power supply method.

The object of the invention, therefore, is to provide a power supply system for an electronic system for process instrumentation and control in which a trouble in one instrumentation and control system is prevented from affecting another in a plurality of instrumentation and control systems comprising a plurality of instruments and connected to a common DC power source.

According to the present invention, in a plurality of instrumentation and control systems comprising a plurality of instruments connected to a common DC power source, there is provided a system for supplying a DC voltage to the plurality of instruments from the DC power source through a current limiter and a device having a DC-wise insulating function provided for each of the instrumentation and control systems. By employing this circuit configuration, any trouble in one instrumentation or control system is prevented from affecting another. In other words, an abnormal voltage which may occur in a given instrumentation and control system cannot reach another instrumentation and control system as it is blocked by a device having an insulating function in DC fashion such as a DC-DC converter. Further, in case of any trouble occurring in an instrumentation and control system, the current limiter at the input terminal of that system such as a fuse burns out and therefore the actuator connected to the output converter is energized in a safe direction.

DETAILED DESCRIPTION OF THE PREFERRED EMBODIMENTS

Figure 1:
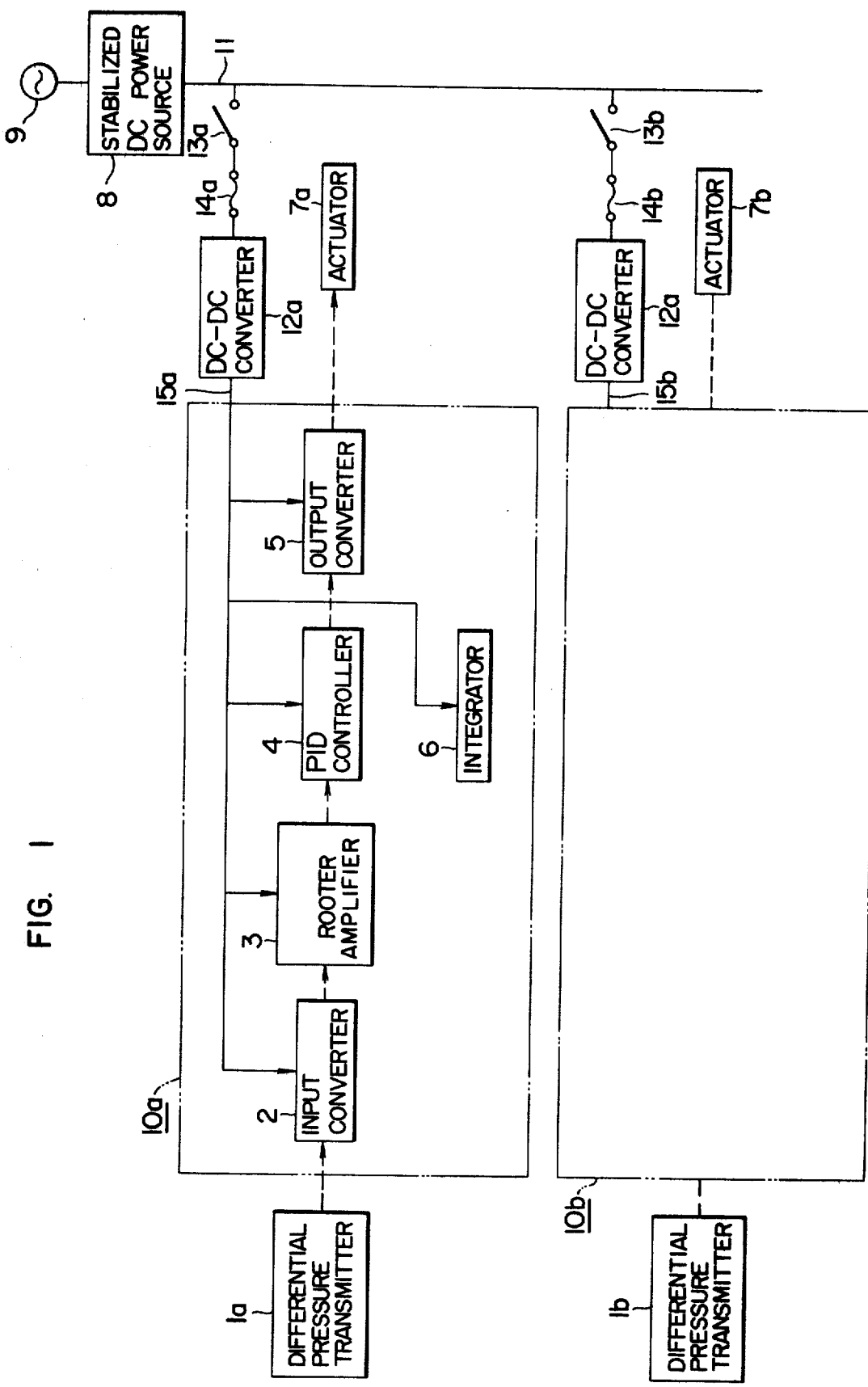
FIG. 1 is a diagram showing an embodiment of the invention referring to a case in which the process variable for an instrumentation and control system is the flow rate.

The diagram of FIG. 1 illustrates an embodiment of the invention involving the flow rate as a process variable. A given process instrumentation and control system $10a$ comprises an input signal converter receiving an input from a differential pressure transmitter $1a$, a rooter amplifier 3, a PID controller 4, an integrator 6 and an output signal converter 5. Power for this control system $10a$ is obtained through a stabilized DC power source 8 for rectifying a commercial power source 9 and stabilizing it at a DC voltage of 24 V, a common DC power line 11, a switch $13a$, a fuse $14a$, and a DC-DC converter $12a$ insulated in DC fashion and including a DC-AC converter, a transformer and a rectifier circuit. Incidentally, power is supplied to the transmitter $1a$ from a separate system.

This stabilized DC power source 8 is capable of supplying power to a plurality of instrumentation and control systems in parallel. In other words, if a second instrumentation and control system $10b$ comprising a second transmitter $1b$ and a second actuator $7b$ is involved in addition to the first instrumentation and control system $10a$, power for both the systems may be supplied from the single stabilized DC power source 8, the second instrumentation and control system having component elements similar to those of the first system.

Explanation will be made now of the manner in which the various disadvantages posed by the conventional methods are obviated by the present invention, with reference to embodiments thereof.

First, assume that an abnormal voltage makes its way into the first instrumentation and control system $10a$ by way of the connection of the transmitter $1a$ and the actuator $7a$ thereto, due to induction or contact with a high voltage. Even though the control operation of the first instrumentation and control system $10a$ is adversely affected, the abnormal voltage, insulated by the DC-DC converter $12a$ having DC-insulation function, does not appear in the common power line 11, thus preventing the control operation of the second instrumentation and control system from being hampered. Neither does the short-circuiting of the power source in the first instrumentation and control system $10a$ affect adversely the output voltage of the stabilized DC power source 8 since the fuse $14a$ burns out. Further, as will be noted from the drawing, only one fuse $14a$ and one DC-DC converter $12a$ are provided in each instrumentation and control system, and therefore the output signal therefrom can be made exactly zero in the case of power failure due to a burnt-out fuse or a fault of the DC-DC converter, thus assuring the safety or the reliability of the plant.

The main advantage of the method shown in FIG. 1 is that any trouble occurring in one of the instrumentation and control systems connected in parallel to a common DC power source is contained in that particular system and prevented without fail from affecting or reaching another system. Also, in the face of a power supply trouble in an instrumentation or control system, the particular system is oriented in a safe direction, thus making possible a safe and reliable plant operation.

Figure 2:
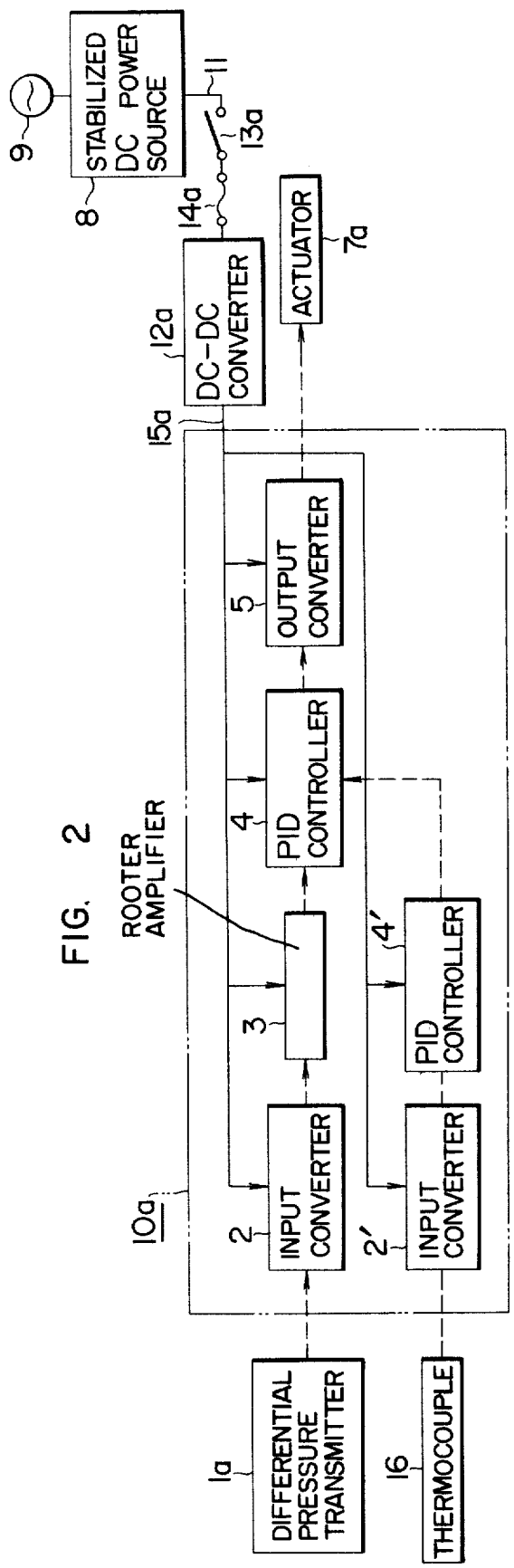
FIG. 2 shows an example of application of the invention to the cascade control system.
Figure 3:
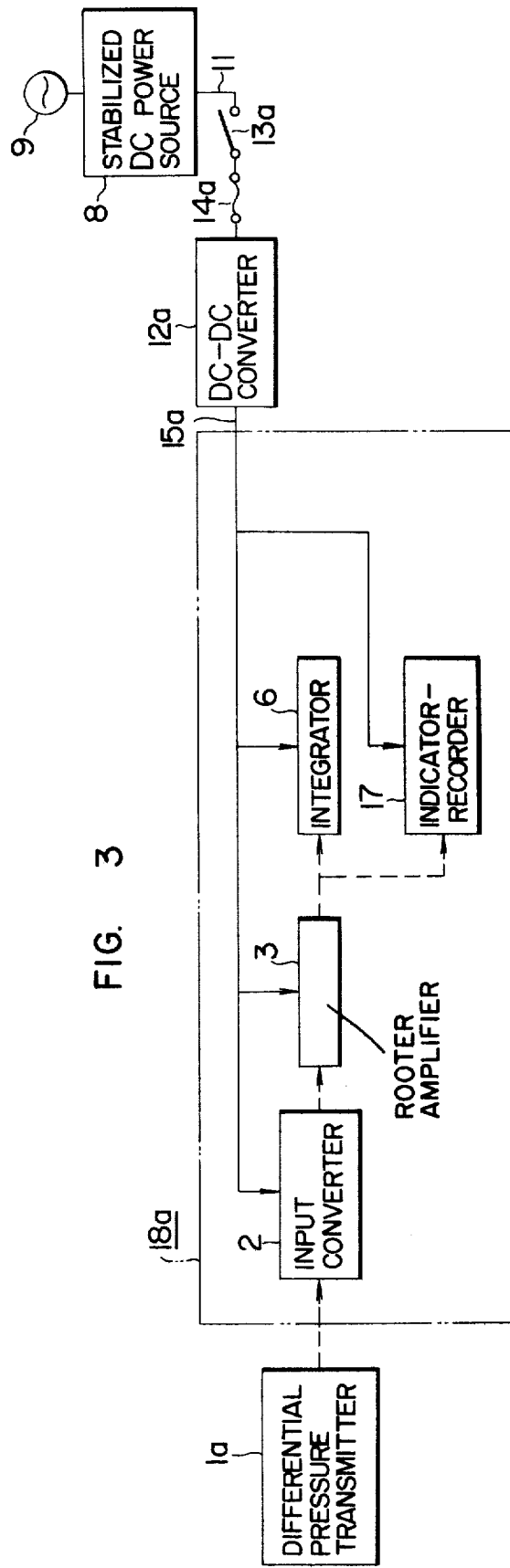
FIG. 3 shows an example of application of the invention to an instrumentation system without any control function.

The invention is not limited to the typical embodiment of FIG. 1 in which one actuator is operated in response to a signal derived from one detection terminal. In an alternative as shown in FIG. 2, a signal from the differential pressure transmitter $1a$ is applied through the input converter 2 and the rooter amplifier 3. An input signal converter 2', on the other hand, amplifies a voltage signal on the order of mV from a thermo-couple 16, and an output of the input signal converter 2' is applied to a PID controller 4'. An output of this PID controller 4' is used as a set value for another PID controller 4, an output of which is in turn applied through an output converter 5 thereby to actuate the actuator 7a. The power supply method according to the invention may be applied with equal effect not only to the above-mentioned cascade control system in which a plurality of detection terminals are connected to one control system; but also to an instrumentation system 18a without any control function as shown in FIG. 3 in which the signal from the differential pressure transmitter 1a is applied through the input converter 2 and the rooter amplifier 3 to the integrator 6 and the indication recorder 17; or to a control system with a plurality of actuation terminals. Furthermore, the power breaking means used in the foregoing description in case of short-circuiting in a power supply circuit is not limited to the fuse but may be replaced by any other acceptable means capable of controlling the current value below a certain level.

Figure 4:
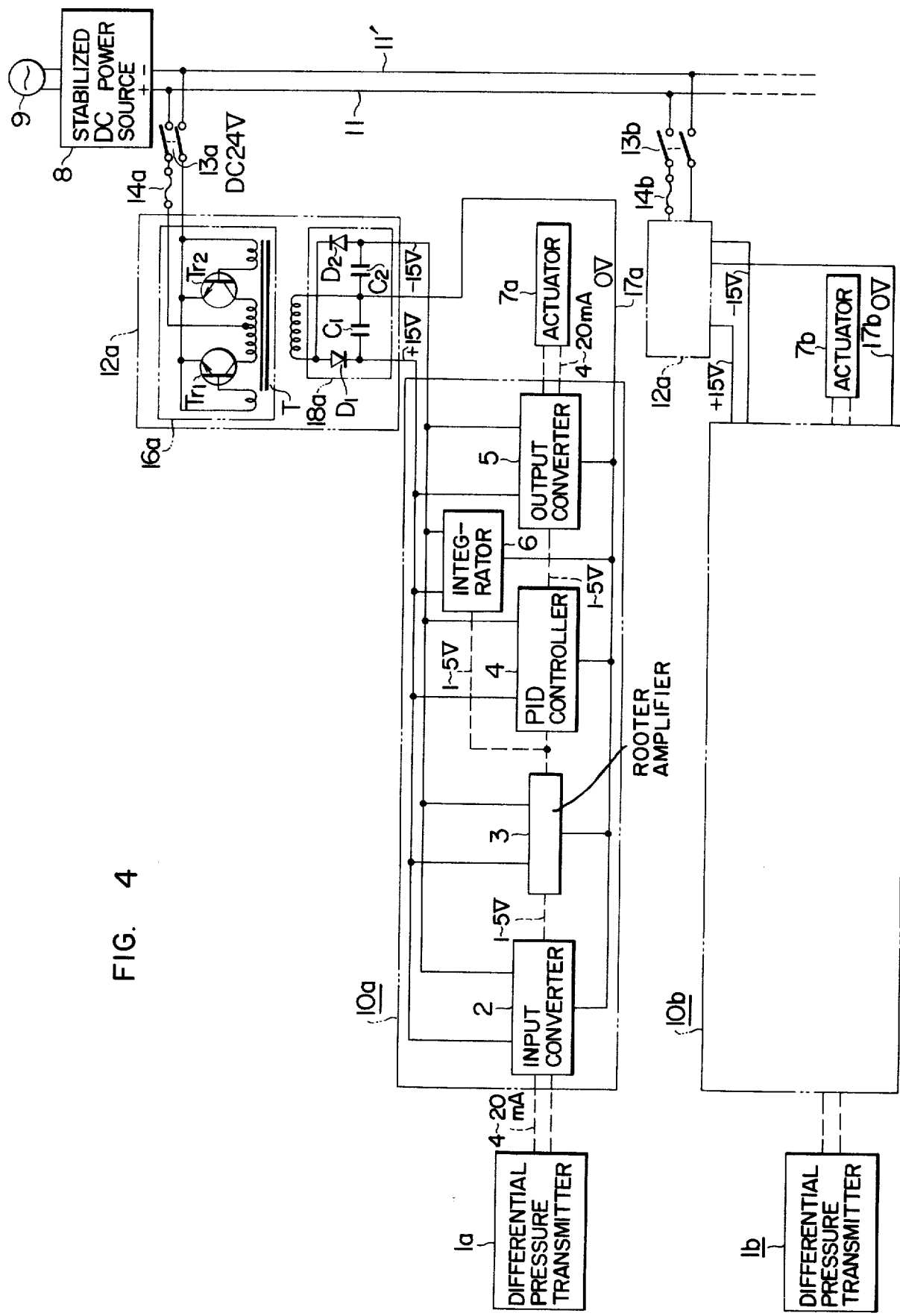
FIG. 4 shows another embodiment of the invention in which a couple of power sources, positive and negative, are provided for a plurality of instruments included in one instrumentation and control system.

The power supply method according to another embodiment of the invention is shown in FIG. 4, in which like reference numerals denote like component elements in FIG. 1.

In the embodiment under consideration, a DC voltage of 24 volts is applied through a switch 13a and a fuse 14a to a magnetic multivibrator 16a comprising transistors Tr1 and Tr2 and a transformer T having a core of a rectangular hysteresis characteristic. The voltage applied to the magnetic multivibrator 16a is converted into an AC signal by the same, and a DC voltage of $\pm 15V$ is produced by a rectifier circuit 18a comprising diodes D1 and D2 and capacitors C1 and C2 on the secondary winding side of the transformer T. This DC voltage is used as power to the aforementioned units 2 to 6. The operation of the units including the input converter 2, the rooter amplifier 3, the PID controller 4, the output converter 5 and the integrator 6 is quite the same as that of the units in the embodiment of FIG. 1 except that the units included in the embodiment under consideration operate in response to a pair of power levels, $\pm 15V$, so that the whole control systems operates quite in the same manner as explained earlier.

In other words, assuming that an abnormal voltage makes its way into the first control system 10a by way of the connection of the transmitter 1a and the actuator 7a thereto, due to induction or contact with a high voltage, the control of the first control system is disturbed. In spite of this, the abnormal voltage, with the DC-DC converter 12a insulated by the transformer T in DC fashion, does not present itself in the common lines 11 and 11', thus preventing the control of the second control system 10b from being adversely affected. Further, the output voltage of the stabilized DC power source 8 is not influenced by the short-circuiting which may occur in the power circuit in the first control system 10a since the fuse 14a burns out.

Figure 5:
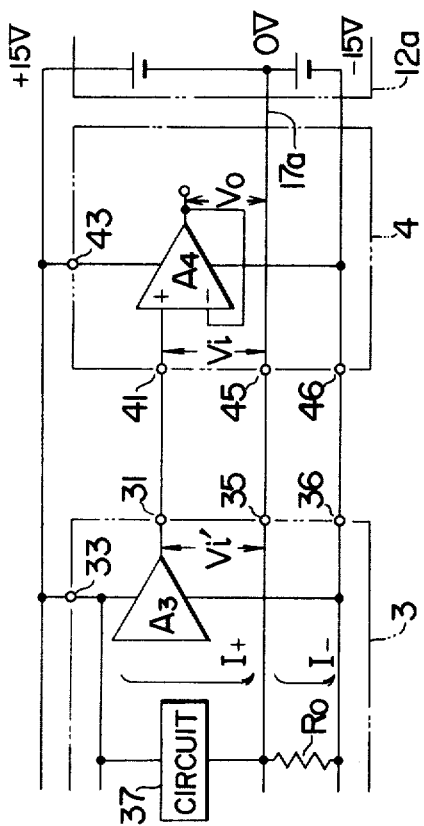
FIG. 5 is a circuit diagram of the rooter amplifier and the PID controller in FIG. 4.

A circuit diagram for the rooter amplifier and the PID controller in FIG. 4 is illustrated in FIG. 5. In this drawing, similar component elements are denoted by similar reference numerals in FIG. 4.

In this embodiment, an amplifier A4 provided with unity feedback is used as an input circuit for the PID controller 4. All the source current for the operational amplifiers used in the rooter amplifier 3 or the PID controller 4 flows from the terminal 33 to 36 or from the terminal 43 to 46 in the direction from $+15V$ power supply toward $-15V$ power supply but not in the OV line 17a, in which only the input current to the operational amplifiers flows. This input current is of no more than the order of several $\mu A$ for each operational amplifier, which is a negligible amount. Even assuming that the circuit configuration inevitably requires a circuit 37 such as a constant-voltage zener diode inserted in the rooter amplifier 3 which must be driven between the positive power supply and the OV line, a pseudo-resistor Ro so provided that a current $I-$ equivalent to the current $I+$ in the circuit 37 flows between the negative power supply and the OV line causes the currents $I+$ and $I-$ to offset each other, thus preventing current flow in the OV line. Should a minute current flow in the OV line 17a, a small number of units is involved since the area supplied by the $\pm 15V$ power supplies is limited to one control system. And therefore the voltage drop between the OV terminal 35 of the rooter amplifier 3 and the OV terminal 45 of the PID controller 4 is kept at a negligibly low level. The output signal Vi' of the rooter amplifier 3 is equals to the voltage Vi between the input terminals 41 and 45, with the result that the output voltage Vo of the input operational amplifier A4 for the PID controller 4 is equal to Vi'. In this way, without regard to the types of signal received by the OV line or the units, the delivery of the signal may be effected by a single connection for a common line or OV line. Further, the $\pm 15V$ power supply, which is most suitable as a power supply for an operational amplifier of two positive-negative power source type, eliminates the need for power division or bias processing. As a result, each unit may be constructed in a very simple circuit configuration.

It will be understood from the foregoing description that according to the present invention a fuse and a DC-DC converter producing a pair of power sources, positive and negative, is provided for each control system in supplying power to a plurality of control systems from a common DC power source, which power sources are used to actuate the instruments making up the particular control system. The invention thus overcomes the disadvantages of the conventional power supply method and has the advantages as described below.

1. The controllability of the other control systems is not deteriorated by the short-circuiting of the power in one control system or by an abnormal voltage arising by way of the field connection to the particular control system, thus providing a power supply method capable of safe plant operation.

2. The fact that a pair of power sources, positive and negative, are provided makes it possible to ignore the voltage drop in the common line, thus realizing accurate signal delivery with a simple wiring system.

3. Since each instrument is operated by a power supply most suitable for an operational amplifier operated with a pair of power sources, positive and negative, the circuit of each instrument can be simplified, resulting in a high reliability and low cost.

Even though the embodiment shown in FIG. 4 uses a DC power source of 24V and the output of the DC-DC converter $\pm 15V$, the invention is not limited to them.

Figure 6:
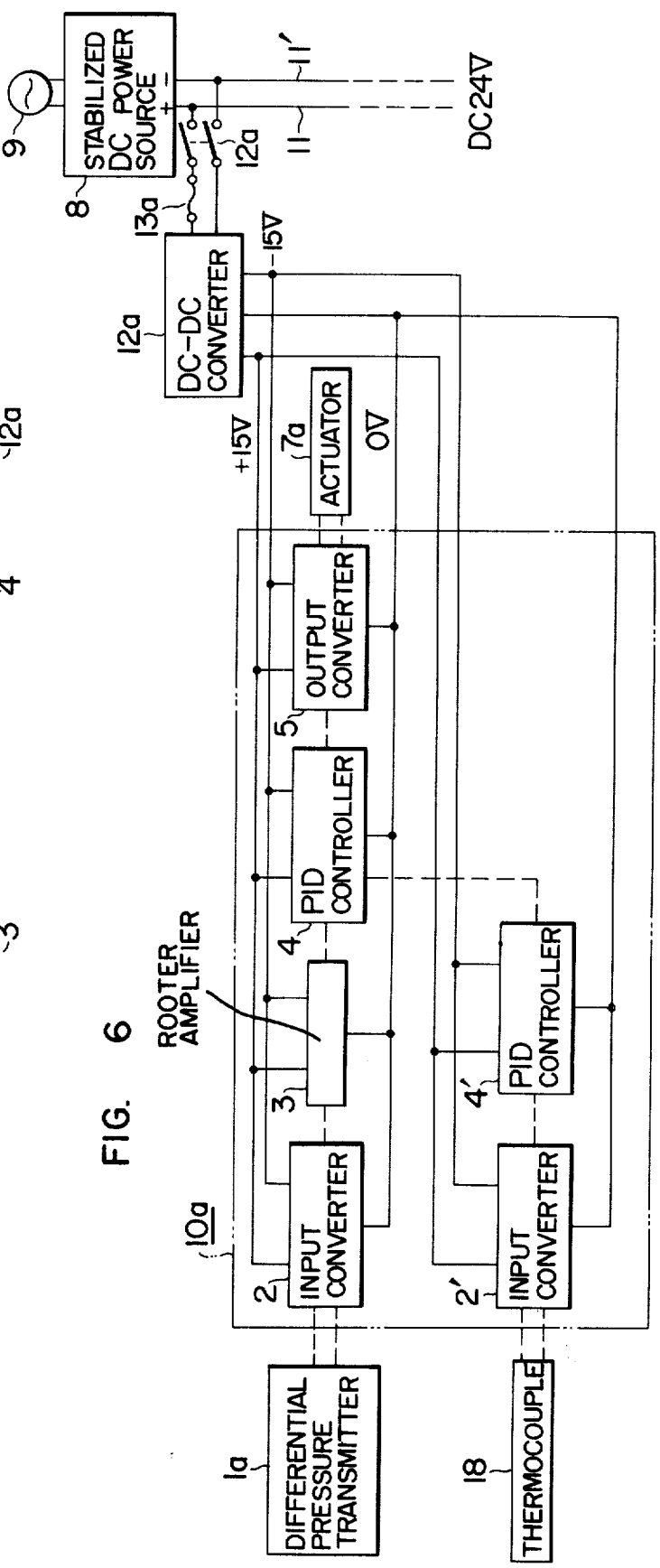
FIG. 6 shows an example of the application of the cascade control system to the embodiment of the invention shown in FIG. 4.

Also, in spite of the above-mentioned embodiment which concerns a typical control system having an actuator operated with a signal at a detection terminal, this invention is not limited to the power supply method for such a control system. In an alternative shown in FIG. 6, for example, a signal from the differential pressure transmitter 1a is applied through the input converter 2 and rooter amplifier 3 to the PID controller 4. On the other hand, a signal on the order of mV from the thermocouple 18 is amplified by the input converter 2', an output signal of which is applied to the PID controller 4', an output of which is in turn used as a set value for the PID controller 4. An output of the PID controller 4 is used to actuate the actuator 7a through the output converter 5. In this cascade control system, a plurality of detection terminals are connected to each control system.

Figure 7:
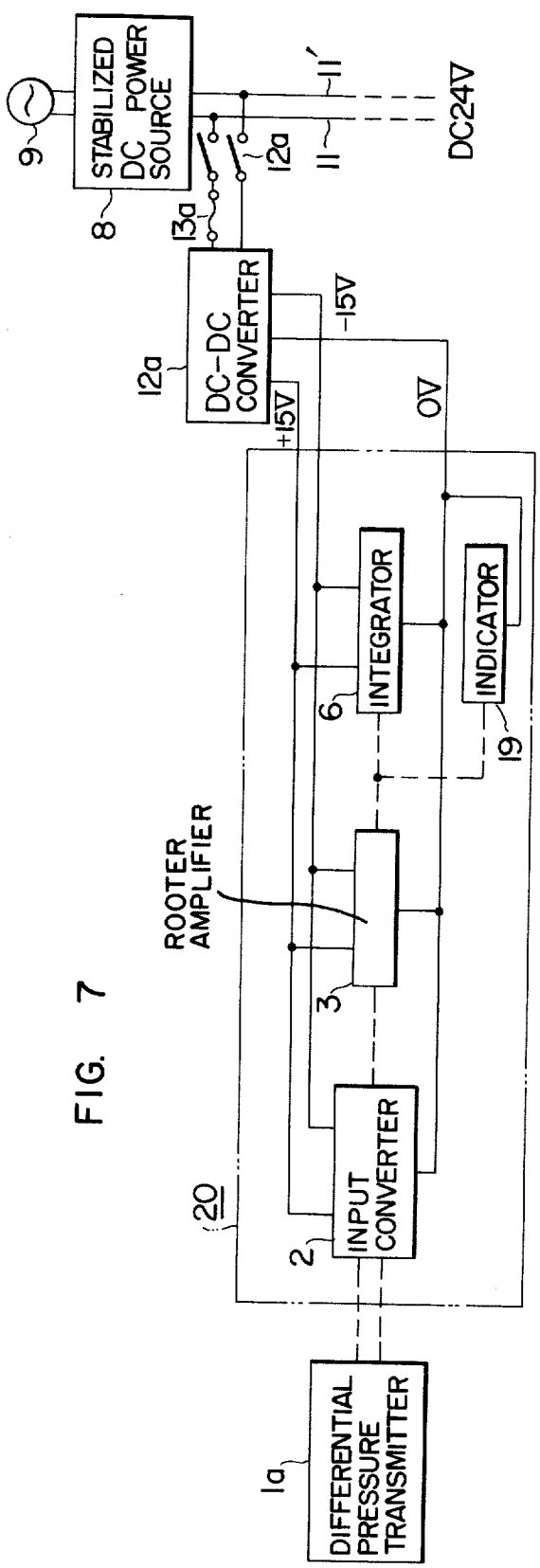
FIG. 7 shows an example of the application of the instrumentation system without any control function to the embodiment shown in FIG. 4.

Further, the power supply system according to the invention may be applied with equal effect to the instrumentation system as shown in FIG. 7 which has the functions of only indication and integration but no control. In this application, a signal from the differential pressure transmitter 1a is linearized through the input converter 2 and the rooter amplifier 3 and then applied to the integrator 6 and the indicator 19.

As still another example of application of the invention, the power supply system according to the invention may be employed for a control system having a plurality of actuation terminals.

In place of the fuse used in the above-mentioned embodiments for cutting off the power supply at the time of power short-circuiting, any other means capable of controlling the current within a predetermined level may be employed.

Figure 8:
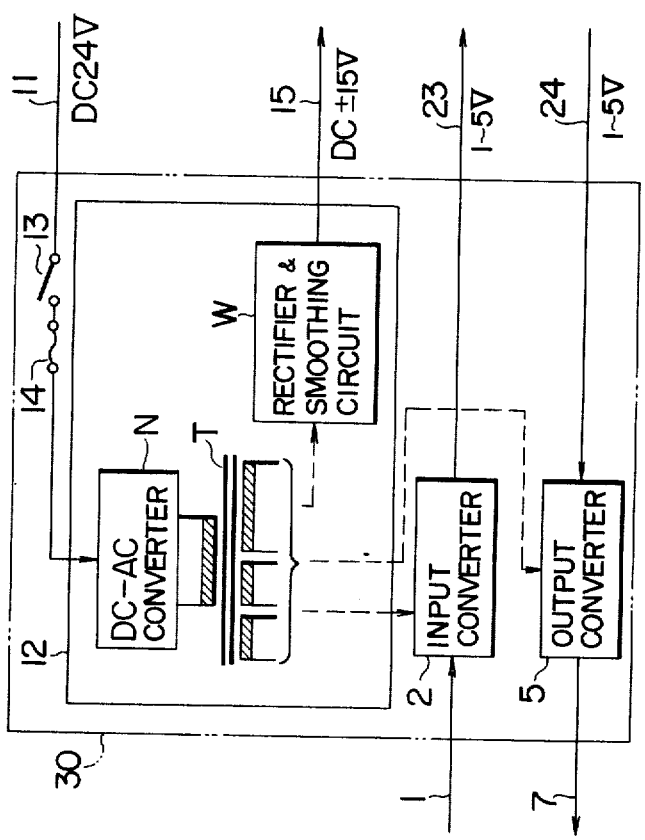
FIG. 8 is a block diagram showing a fundamental construction of the signal converter according to an embodiment of the invention.

Another embodiment of the invention is shown in FIG. 8, which is characterized by a signal converter 30 comprising the input converter 2, the output converter 5, the switch 13, the fuse 14, and the device 12 having a DC-insulating function, all concentrated at a place.

A DC voltage of 24V from the common power bus 11 is applied through the power switch 13 and a fuse 14 to the DC-AC converter N of the power supply section 12 having a power supply function. The DC-AC converter N converts the input thereto into an AC voltage, which is insulated by the transformer T in DC fashion from the common power bus 11 leading to the DC power supply 11 common to a plurality of control systems. The AC voltage of the secondary winding of the transformer T is applied to the rectifier-smoothing circuit W, whereby a DC voltage 15 of ±15V is obtained as a system power source for a plurality of instruments of a control system. Reference numeral 2 shows an input converter capable of input signal conversion, whereby the process input signal from the detector 1 is converted into a uniform instrumentation DC voltage 23 of 1 to 5V.

Of the process input and output signals 1 and 7, the signal 1 depends to a large measure on the types of objects to be conrolled and purpose of control. For example, it is a 4 to 20mA DC current when the detector 1 is a two-line transmitter; it is mV signal when the detector is a thermocouple; it is based on resistance variation when the detector is a resistance thermometer bulb; and a pulse train when the detector is a tachometer. The characteristic of the process input signal 1 takes various forms including linear and non-linear ones. Therefore, it is necessary to provide a plurality of input conversion sections 2 having functions suitable to the detector 1 including supply of power for the two-line transmitter, the mV/V conversion, the ma/V conversion, the resistance-voltage conversion, the AC-DC conversion, linearization and the DC-wise insulation from the detection terminals, thus permitting an always-linearized instrumentation voltage 23 to be produced regardless of the type of process input signal. Numeral 5 shows an output signal converter section having the function of output signal conversion, which produces, for instance, a uniform process output signal of 4 to 20mA in response to an operational DC voltage 24 of 1 to 5V from the controller 4. The input and output signal conversion sections 2 and 5 are driven by a DC voltage obtained by rectifying and smoothing the AC voltage across the secondary winding of the transformer T of the power supply section 12, or by a DC voltage 15 of ±15V. By the way, in the event that the detector 1 consists of a thermocouple or when a complicated correcting operation control is wanted, the field-side process input and output signals 1 and 7 may be easily insulated in DC fashion from each other by inserting a DC-AC converter and an insulating transformer in the signal conversion sections 2 and 5, taking advantage of the AC voltage across the secondary winding of the transformer T as an exciting voltage for DC-AC conversion.

Figure 9:
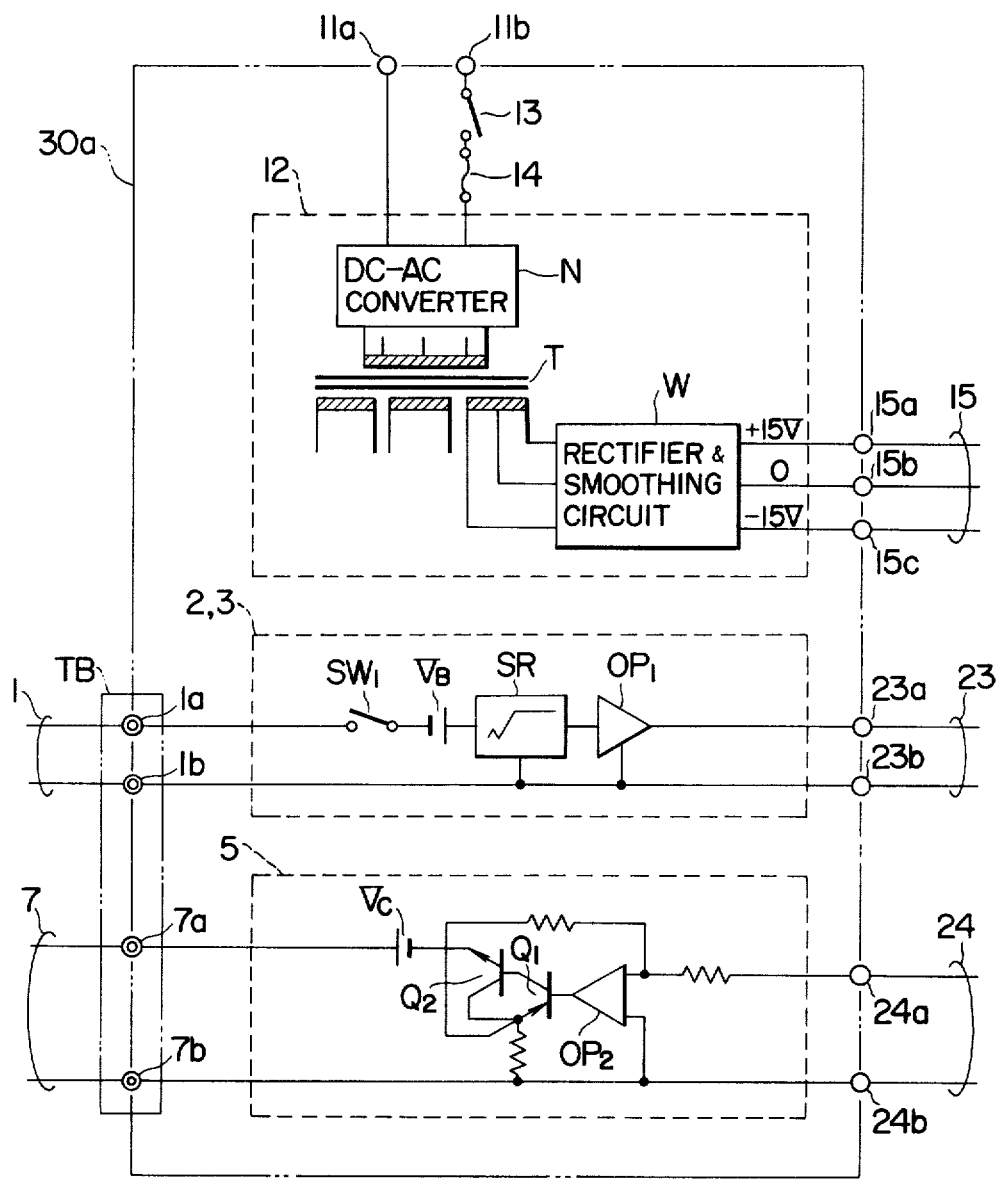
FIGS. 9 and 10 show constructions of a specific example of the signal converter according to the invention.
Figure 10:
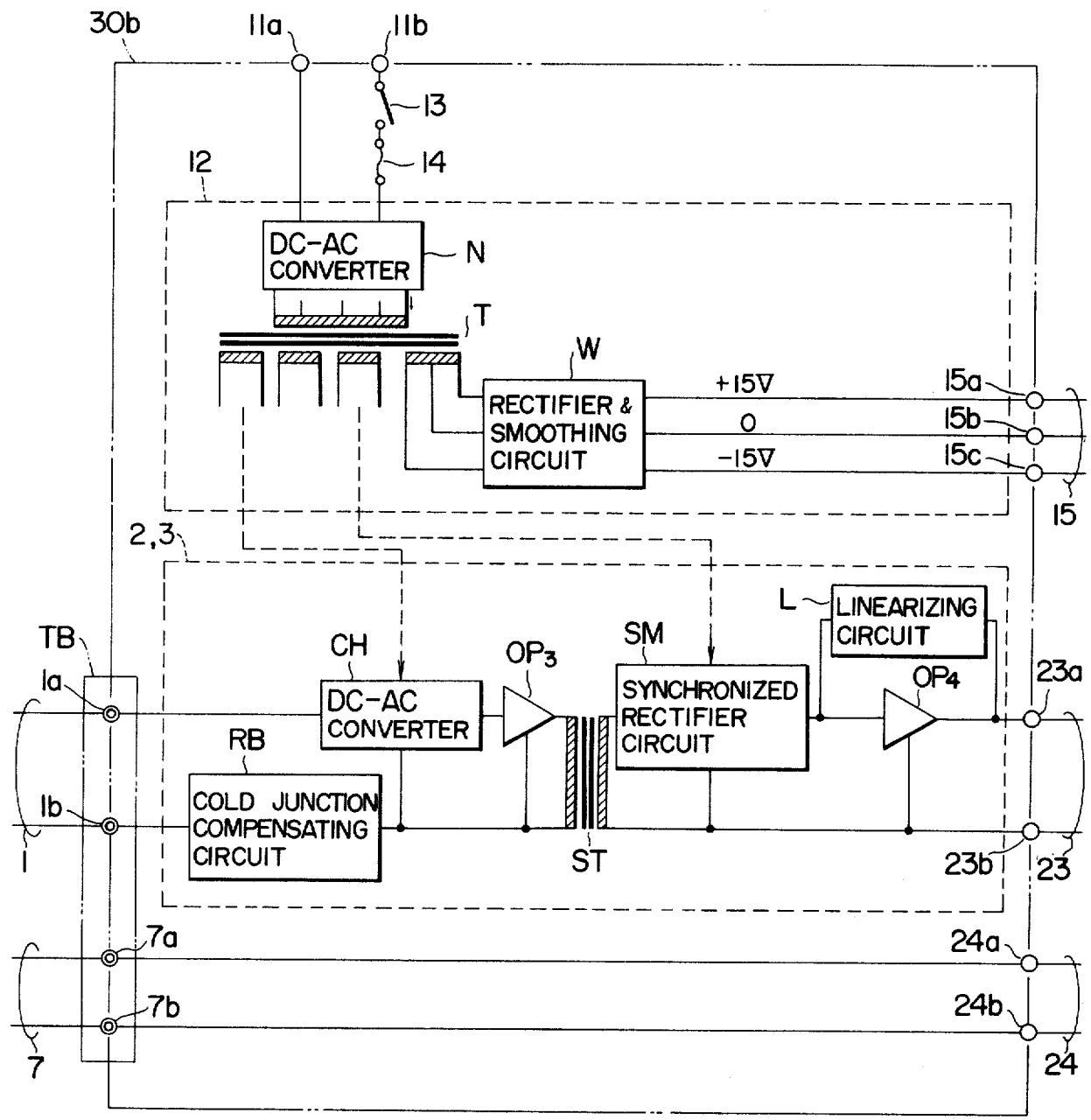

More detailed examples of the signal converter 30 of FIG. 8 are shown in the block diagrams of FIGS. 9 and 10, in which like numerals denote like component elements in FIG. 8 and will not be described. Symbols 1a and 1b show terminals to which the process input signal is applied from the detector 1, and symbols 7a and 7b terminals from which the process output signal is produced to the actuator 7, both types of terminals being mounted on a field-wiring terminal board TB. 11a and 11b show terminals to which the DC voltage of 24V is applied through the DC power source 8 common to a plurality of control systems, and 15a to 15c terminals for producing a DC voltage 15 of ±15V which makes up a system power source for a plurality of instruments included in a single control system. 23a and 23b show output terminals from which the instrumentation voltage 23 of DC 1 to 5V is produced, and 24a and 24b input terminals to which the operational signal 24 from the PID controller 11 is applied. As these terminals, wire wrapping terminals for wrapping wiring may be used.

A specific example of the signal converter 30a for a flow-rate integration system using such reducing means as an orifice is illustrated in FIG. 9. In this case, a two-line differential pressure transmitter is used as the detector 1, and a DC current signal of 4 to 20mA corresponding to a differential pressure signal proportional to the square of the flow-rate is applied to the terminals 1a and 1b. The process input signal 1 is linearized by the rooter circuit SR of the input signal conversion section 2, converted into an instrumentation signal 23 of DC 1 to 5V by the operational amplifier OP1, and applied to the terminals 23a and 23b. SW1 shows a power switch. The operational voltage 24 of DC 1 to 5V from the controller 11 is applied to the terminals 24a and 24b, converted into the process output signal 7 of DC 4 to 20mA by the operational amplifier OP2 and the transistors Q1 and Q2 of the output signal conversion section 5, and then led to the terminals 7a and 7b.

In the circuit, symbol Vc shows a DC voltage for driving the transistors Q1 and Q2. The rooter circuit SR and the operational amplifiers OP1 and OP2 are driven by the DC voltage 15 ±15V connected to the terminals 15a to 15c as a system power source.

The voltages $V_B$ and $V_C$ are AC voltages across the secondary winding of the transformer T of the power supply section which have been rectified and smoothed. The other power sources are the same as those in FIG. 8 and will not be described here.

A specific example of the signal converter 30b for a temperature control system is shown in FIG. 10. In this example, a thermocouple is used as the detector 1, and the operational signal 24 from the controller 4 takes the form of a current signal of DC 4 to 20mA. The DC operational signal 24 of 4 to 20mA applied to the terminals 24a and 24b is directly applied to the terminals 7a and 7b and produced as a process output signal 7. As will be noted, the output signal conversion section 5 is not required. In the case where the operational signal 24 is a voltage signal or where DC insulation is necessary from the process output signal 7, an output signal conversion section 5 having a voltage-current conversion characteristic or comprising a DC-AC converter or an insulating transformer must be provided. In this case, the AC voltage across the secondary winding of the transformer T of the power supply section 12 is used for excitation of the DC-AC converter. The terminals 1a and 1b are impressed with the electromotive force DC mV of the thermocouple as a process input signal 1. This mV signal is adjusted in terms of room temperature by the cold junction compensating circuit RB of the input signal conversion section 2, converted into an AC voltage by the DC-AC converter CH, AC amplified by the amplifier OP3, insulated in DC fashion from the process input signal 1 on the field side by the insulating transformer ST, linearized into an instrumentation signal 23 of DC 1 to 5V by the operational amplifier OP4 and the linearizing circuit L through the synchronous rectifier circuit SM, and then led to the terminals 23a and 23b. For excitation of the DC-AC converter CH and the synchronized rectifier circuit SM, the AC voltage across the secondary winding of the transformer T of the power supply section 12 is used. Also, the AC amplifier OP3 is driven by a DC voltage obtained by rectifying and smoothing the AC voltage across the secondary winding of the transformer T. On the other hand, the operational amplifier OP4 is driven by the DC voltage 15 of ±15V led to the terminals 15a to 15c. The operation is the same as in the case of FIG. 8 and will not be described.

When the above-described signal converter is applied to the process control system, the advantages as mentioned below result.

1. Since DC insulation is provided for each control system from the DC power source common to a plurality of control systems, a trouble, if any, in a given control system will not affect the other control systems through the common power supply bus.

2. In the event that the DC-AC converter of the power supply section of the signal converter in a given control system develops a fault, all the instruments included in the particular control system stop their operation thereby to reduce the process output signal to zero, thus enabling the operation of the actuator on the safe side.

3. Since the input and output conversion sections for delivery of process input and output signals to and from an object to be controlled are integrated with the power supply section for supplying power to the component elements or instruments of a controlled system involved, a dual protective measure including the manual back-up, manual operation, and the holding of the operation output at the time of the control system failure due to the burnt-out state of the fuse may be easily realized at a single point by the use of an output independent of the control system.

4. Since the connection terminals for the process input and output signals on field side are concentrated on the field wiring terminal board of the signal converter, the wiring treatment is easy on the one hand and undesirable contact with the wiring of the instruments on the instrument chamber side is avoided on the other. Thus a substantially safe explosion-proof system is easily put into practice.

5. Even when a plurality of control systems each including a plurality of instruments are involved, each control system may be constructed on the basis of a signal converter and therefore can be clearly distinguished from the other control systems. Also, treatment of process input and output signals which vary with the objects of control and the purpose of control is concentrated in the signal converter, thus facilitating the maintenance and inspection work.

6. The process input and output signals can be easily insulated in DC fashion from each other.

7. The fact that only one circuit of the DC-AC converter is enough for each control system makes possible a simple construction, consuming a less amount of power.

8. Since a common power source is provided only for the signal converter in each control system, there is no need for a switch board containing a power switch and a fuse.

9. Even when a two-line transmitter is used as the detector, the power for the transmitter is easily obtained by rectifying and smoothing the AC voltage across the secondary winding of the transformer of the power supply section, thus eliminating the need for provision of a special power device or distributor for the two-line transmitter.

Figure 11:
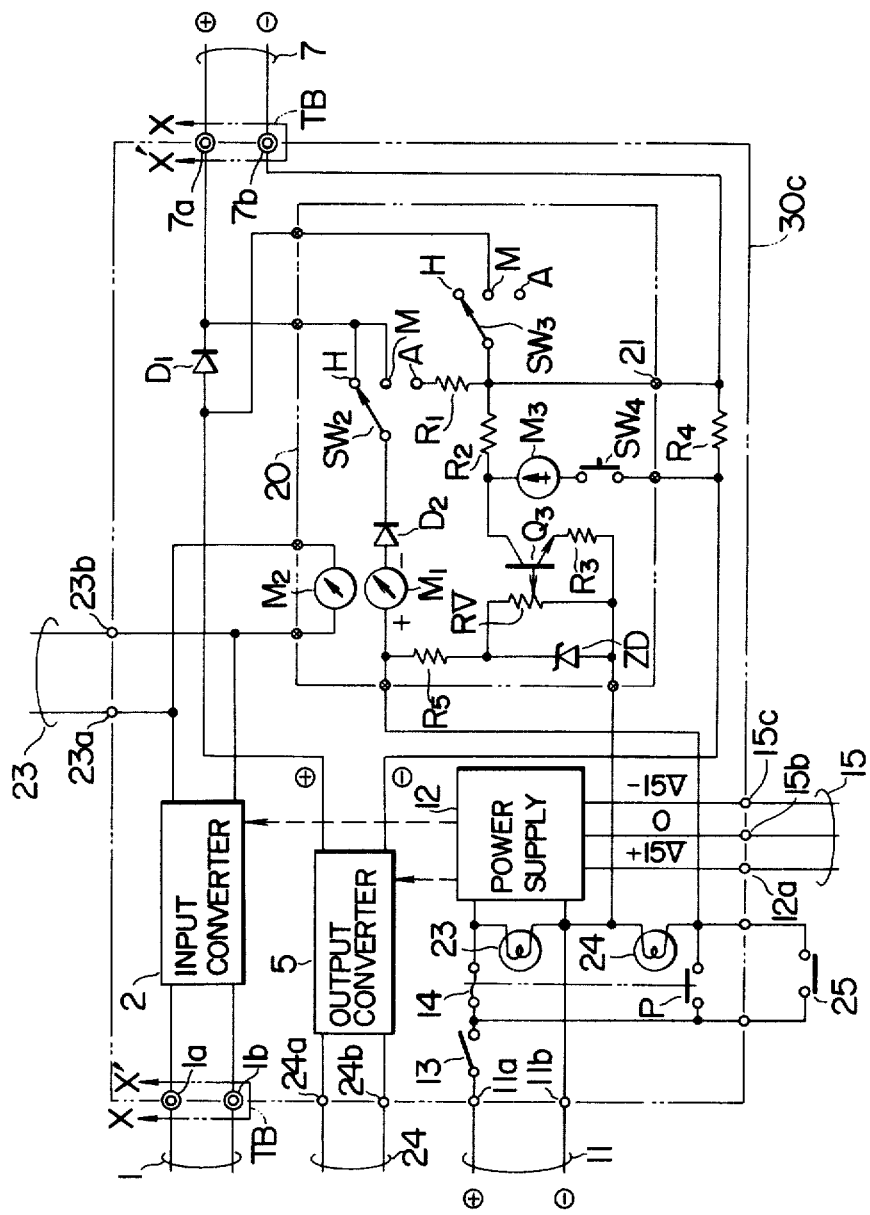
FIG. 11 is a diagram showing a construction of the signal converter according to another embodiment of the invention.

A signal converter according to still another embodiment of the invention is shown in FIG. 11. Making effective use of the above-mentioned features, this signal converter has a construction adopting the dual safety measures of an output holding and manual back-up with a manual output independent of an automatic output from the control system involved. In FIG. 11, like reference numerals denote like component elements with like numerals in FIGS. 8 to 10 inclusive. The embodiment of FIG. 11 is different from those of FIGS. 8 to 10, for one part, in that a connector 21 is provided as connecting means for inserting the manual back-up circuit 20. The manual back-up circuit 20 is connected through the connector 21 to the output circuit of the output signal conversion section 5 and so constructed as to be easily replaceable. Without using the connector 21, the manual back-up circuit 20 may be previously incorporated in the signal converter 30c. Another difference of the embodiment under consideration from those of FIGS. 8 to 10 is that an alarm fuse 14 is interlocked with an alarm contact P in order to issue an alarm when a blowing of the fuse 14 is detected.

The operation of the embodiment in FIG. 11 will be described below. The devices other than the signal converter are not shown, for which please refer to FIG. 8. Also, it is assumed that the process output signal 7 is a current output of DC 4 to 20 mA.

a. Under normal operating condition:

Assume that the back-up circuit 20 is disconnected from the connector 21 or that, with the manual back-up circuit 20 connected to the connector 21, the contacts of the interlocked switches SW2 and SW3 are positioned either at output hold "H" or automatic output "A" other than the manual output "M". When the power switch 13 is closed, the DC voltage of 24V applied to the terminals 11a and 11b from the DC power supply 8 is applied to the power supply section 12 through the alarm fuse 14, while at the same time turning on the power indication lamp 23. Under this condition, the DC voltage of 24V is not supplied to the manual back-up circuit 20, which is therefore not energized. As a result, automatic operation is effected by the output of the output signal conversion section 5 quite in the same way as in the case of the embodiment explained with reference to FIG. 8.

b. When the output is wanted to be held with the fuse burnt-out or otherwise broken:

The manual back-up circuit 20 is connected in advance and the contacts of the interlocked switches SW2 and SW3 closed to "H" side. When the alarm fuse 14 burns out by an excess current, the alarm lamp P contained in the fuse 14 is turned on. The lamp 23 is turned off and the power supply to the power supply section 12 is cut off, with the result that the automatic output of the output signal conversion section 5 becomes zero. On the other hand, the DC voltage of 24V is applied through the power switch 13 and the alarm contact P to the manual back-up circuit 20 thereby to turn on the alarm indication lamp 24. The output current at the terminals 7a and 7b is held at an optimum value for the control system which is predetermined by the variable resistor RV of the manual back-up circuit 20 without regard to the automatic output, thus preventing the process output signal 7 from being reduced to zero. Subsequently, by adjusting the variable resistor RV, the actuator 7 is capable of being operated manually. The output under this condition is indicated on the ammeter M1.

c. When switching from automatic operation to manual back-up:

The contacts of the interlocked switches SW2 and SW3 are closed to "A" and the manual back-up circuit 20 is connected to the connector 21. Under this condition, automatic operation is carried out by the output of the output signal conversion section 5 as in the case of the manual back-up circuit 20 being removed as mentioned in (a) above. The external command contact 25 is closed, and then the indication lamp 24 is turned on while at the same time supplying the DC voltage 24V to the manual back-up circuit 20, thus initiating the operation of the manual back-up circuit 20. The manual output current is bypassed, flowing in the interlocked change-over switch SW2, resistor R1, resistor R2, transistor Q3 and resistor R3 in that order, so that the process output signal 7 of the terminals 7a and 7b still takes the form of an automatically-produced output of the output signal conversion section 5. Under this condition, the value of the automatic output current may be detected by the resistor R4 and the manual output current by the resistor R2. If the value of the resistor R2 is selected equal to that of resistor R4 and the variable resistor RV is adjusted to make the indication of the balance meter M3 zero with the push button switch SW depressed, then the automatic output and manual outputs become equal in value. When the interlocked change-over switches SW2 and SW3 are closed to "M" subsequently, the process output signal 7 at the terminals 7a and 7b is switched from automatic output to manual output smoothly, so that it becomes possible to manually operate the actuator 7a or 7b with a manual output of the manual back-up circuit 20 independent of the automatic output of the control system. The manual output current may be adjusted by the variable resistor RV and indicated on the ammeter M1. In view of the fact that the process instrumentation voltage 1 is indicated on the voltmeter M2, manual operation is easy while watching the meter M2. By the way, the automatic output current produced during the manual operation is bypassed through the switch SW3 and the resistor R4. Symbol R5 shows a resistor, ZD a voltage-stabilizing zener diode, and D1 and D2 reverse current blocking diodes.

The above-mentioned embodiments have the great advantage that not only the process control system can be constructed in simple way but the safety of the control system may be improved.

It will thus be understood from the foregoing description that according to the invention it is possible to provide a power supply method for electronic control systems in which a fault, if any, of one of instrumentation and control systems connected to a common DC power source does not affect the other instrumentation and control systems.

We claim:

1. In a plurality of electronic instrumentation and control systems each comprising at least one input signal converter for converting process input signals into uniform electrical signals and at least one measuring instrument connected to said converter, an electronic system for process instrumentation and control comprising a DC power source common to said electronic instrumentation and control system, current limiter provided for said instrumentation and control systems and a DC insulating device provided for each of said electronic instrumentation and control systems, said converter and said measuring instrument being impressed with at least a DC positive and a DC negative voltage from said common DC power supply through said current limiter and through said devices.

2. In a plurality of electronic instrumentation and control system, each comprising at least an input signal converter for converting process input signals into uniform electrical signals, at least one measuring instrument connected to said converter, and an output signal conversion section for converting said uniform electrical signals from said instrument into a process output signal, an electronic system for instrumentation and control comprising a DC power source common to said electronic instrumentation and control systems, current limiters provided for said instrumentation and control systems, and a DC-wise insulating device provided for each of said systems, said input and output signal converters and said measuring instrument being impressed with at least a DC positive and a DC negative voltage from said common DC power source through said current limiters and through said DC-wise insulating devices.

3. In a plurality of electronic instrumentation and control systems each comprising at least an input signal converter for converting process input signals into uniform electrical signals and at least a measuring instrument connected to said converter, an electronic system for instrumentation and control comprising a DC power source common to said electronic instrumentation and control systems, a current limiter provided for said electronic instrumentation and control systems and a DC-wise insulating device provided for each of said systems, said converter and said measuring instrument, being impressed with at least a DC positive and a DC negative voltages from said DC power source through said current limiter, through said DC-wise insulating devices, said converter and said measuring instrument sharing a junction point connected to said DC-wise insulating device.

4. In a plurality of electronic instrumentation and control systems each comprising at least an input signal converter for converting process input signals into uniform electrical signals, at least a measuring instrument connected to said converter, and an output signal conversion section for converting said uniform electrical signals into process output signals, an electronic system for instrumentation and control comprising a DC power source common to said electronic instrumentation and control systems, current limiters provided for said electronic instrumentation and control systems, and a DC-wise insulating device provided for each of said systems, said input signal converter, said output signal converter and said measuring instrument being impressed with at least a DC positive and a DC negative voltage from said DC power source through said current limiters and through said DC insulating devices, said input and output converters and said measuring instrument sharing a junction point connected to said DC-wise insulating devices.

5. In a plurality of electronic instrumentation and control systems comprising at least an input signal converter for converting process input signals into uniform electrical signals, and at least a measuring instrument and apparatus connected to said converter, an electronic system for instrumentation and control comprising a DC power source common to said electronic instrumentation and control systems, current limiters provided for said electronic instrumentation and control systems, and a DC-wise insulating device provided for each of said systems, said converter and said measuring instrument and apparatus being impressed with at least a DC positive and a DC negative voltage from said DC power source through said current limiters and through said DC-wise insulating devices.

6. In a plurality of electronic instrumentation and control systems each comprising at least an input signal converter for converting process input signals into uniform electrical signals, at least an operational unit connected to said converter, and at least a measuring instrument and apparatus connected to said operational unit, an electronic system for instrumentation and control comprising a DC power source common to said electronic instrumentation and control systems, a current limiters provided for said electronic instrumentation and control systems, and a DC-wise insulating device provided for each of said systems, said converter and said operational unit and said measuring instrument and apparatus being impressed with at least a DC positive and a DC negative voltage from said DC power source through said current limiters and through said DC-wise insulating devices.

7. In a plurality of electronic instrumentation and control systems each comprising at least an input signal converter for converting process input signals into uniform electrical signals, at least a controller connected to said converter, and at least an output signal conversion section connected to said controller and converting said uniform electrical signals into process input signals, an electronic system for instrumentation and control comprising a DC power source common to said electronic instrumentation and control systems, a current limiters provided for said electronic instrumentation and control systems, and a DC-wise insulating device provided for each of said systems, said input and output converters and said controller being impressed with at least a DC positive and a DC negative voltage from said DC power source through said current limiters and through said DC-wise insulating devices.

8. In a plurality of electronic instrumentation and control systems each comprising at least an input signal converter for converting process input signals into uniform electrical signals, at least an operational unit connected to said converter, and at least a controller connected to said operational unit, and at least an output signal conversion section connected to said controller and converting said uniform electrical signals from said controller into process output signals, an electronic system for instrumentation and control comprising a DC power source common to said electronic instrumentation and control systems, current limiters provided for said electronic instrumentation and control systems, and a DC-wise insulating device provided for each of said systems, said input and output converters, said operational unit and said controller being impressed with at least a DC positive and a DC negative voltage from said DC power source through said current limiters, and through said Dc insulating devices.

9. In a plurality of electronic instrumentation and control systems each comprising at least an input signal converter for converting process input signals into uniform electrical signals, at least a measuring instrument and apparatus connected to said converter, at least a controller connected to said converter, and at least an output signal conversion section connected to said controller and converting said uniform signals from said controller into process output signals, an electronic system for instrumentation and control comprising a DC power source common to said electronic instrumentation and control systems, current limiters provided for said electronic instrumentation and control systems, and a DC-wise insulating device provided for each of said systems, said input and output converters, said measuring instrument and apparatus and said controller being impressed with at least a DC positive and a DC negative voltage from said DC power source through said current limiters and through said DC-wise insulating devices.

10. In a plurality of electronic instrumentation and control systems each comprising at least an input signal converter for converting process input signals into uniform electrical signals, at least an operational unit connected to said converter, at least a measuring instrument and apparatus connected to said operational unit, at least a controller connected to said operational unit, and at least an output signal conversion section connected to said controller and converting said uniform electrical signals from said controller into process output signals, an electronic system for instrumentation and control comprising a DC power source common to said electronic instrumentation and control systems, current limiters provided for said electronic instrumentation and control systems, and a DC-wise insulating device provided for each of said systems, said input and output converters, said operational unit, said measuring instrument and apparatus and said controller being impressed with at least a DC positive and a DC negative voltage from said DC power source through said current limiters and through said DC-wise insulating devices.

11. In a plurality of electronic instrumentation and control systems each comprising an input signal converter for converting process input signals into uniform electrical signals and at least a measuring instrument and apparatus connected to said converter, an electronic system for instrumentation and control comprising a DC power source common to said electronic instrumentation and control systems, current limiters provided for said electronic instrumentation and control systems, and a DC-wise insulating device provided for each of said systems, said converter and said measuring instrument and apparatus being impressed with at least a DC positive and a DC negative voltage from said DC power source through said current limiters and through said DC-wise insulating devices, said converter and said measuring instrument and apparatus sharing a junction point connected to said DC-wise insulating devices.

12. In a plurality of electronic instrumentation and control systems each comprising an input signal converter for converting process input signals into uniform electrical signals, an operational unit connected to said converter, and a measuring instrument and apparatus connected to said operational unit, an electronic system for instrumentation and control comprising a DC power source common to said electronic instrumentation and control systems, current limiters provided for said electronic instrumentation and control systems, and a DC-wise insulating device provided for each of said systems, said converter, said operational unit and said measuring instrument and apparatus being impressed with at least a DC positive and a DC negative voltage from said DC power source through said current limiters and through said DC-wise insulating devices, said converter, said operational unit and said measuring instrument and apparatus sharing a junction point connected to said DC-wise insulating devices.

13. In a plurality of electronic instrumentation and control systems each comprising at least an input signal converter for converting process input signals into uniform electrical signals, at least a controller connected to said converter, and at least an output signal conversion section connected to said controller and converting said uniform electrical signals into process output signals, an electronic system for instrumentation and control comprising a DC power source common to said electronic instrumentation and control systems, current limiters provided for said electronic instrumentation and control systems and a DC insulating device provided for each of said systems, said input and output converters and said controller being impressed with at least a DC positive and a DC negative voltage from said DC power source through said current limiters and through said DC insulating devices, said input and output converters and said controller sharing a junction point connected to said DC-wise insulating devices.

14. In a plurality of electronic instrumentation and control systems each comprising at least an input signal converter for converting process input signals into uniform electrical signals, at least an operational unit connected to said converter, at least a controller connected to said operational unit, and at least an output signal conversion section connected to said controller and converting said uniform electrical signals into process output signals, an electronic system for process instrumentation and control comprising a DC power source common to said electronic instrumentation and control system, current limiters provided for said electronic instrumentation and control systems, and a DC-wise insulating device provided for each of said systems, said input and output converters, said operational unit and said controller being impressed with at least a DC positive and a DC negative voltage from said DC power source through said current limiters and through said DC-wise insulating devices, said input and output converters, said operational unit and said controller sharing a junction point connected to said DC-wise insulating devices.

15. In a plurality of electronic instrumentation and control systems each comprising at least an input signal converter for converting process input signals into uniform electrical signals, at least a measuring instrument and apparatus connected to said converter, at least a controller connected to said converter and at least an output signal conversion section connected to said controller and converting said uniform electrical signals into process output signals, an electronic system for process instrumentation and control comprising a DC power source common to said electronic instrumentation and control system, current limiters provided for said electronic instrumentation and control systems, and a DC-wise insulating device provided for each of said systems, said input and output converters, said measuring instrument and apparatus and said controller being impressed with at least a DC positive and a DC negative voltage from said DC power source through said current limiters and through said DC-wise insulating devices, said input and output converters, said measuring instrument and apparatus and said controller sharing a junction point connected to said DC-wise insulating devices.

16. In a plurality of electronic instrumentation and control systems each comprising at least an input signal converter for converting process input signals into uniform electrical signals, at least an operational unit connected to said converter, at least a measuring instrument and apparatus connected to said operational unit, at least a controller connected to said operational unit, and at least an output signal conversion section connected to said controller and converting said uniform electrical signals into process output signals, an electronic system for process instrumentation and control comprising a DC power source common to said electronic instrumentation and control systems, current limiters provided for said electronic instrumentation and control systems, and a DC-wise insulating device provided for each of said systems, said input and output converters, said operational unit, said measuring instrument and apparatus and said controller being impressed with at least a DC positive and a DC negative voltage from said DC power source through said current limiters and through said DC-wise insulating devices, said input and output converters, said operational unit, said measuring instrument and apparatus and said controller sharing a junction point connected to said DC-wise insulating devices.

17. An electronic system for process instrumentation and control according to claim 3, in which a pseudo resistor is inserted between said negative power source and said junction point in order to offset the current flowing between said positive power source and said junction point.

18. An electronic system for process instrumentation and control according to claim 4, in which a pseudo resistor is inserted between said negative power source and said junction point in order to offset the current flowing between said positive power source and said junction point.

19. An electronic system for process instrumentation and control according to claim 11, in which a pseudo resistor is inserted between said negative power source and said junction point in order to offset the current flowing between said positive power source and said junction point.

20. An electronic system for process instrumentation and control according to claim 12, in which a pseudo resistor is inserted between said negative power source and said junction point in order to offset the current flowing between said positive power source and said junction point.

21. An electronic system for process instrumentation and control according to claim 13, in which a pseudo resistor is inserted between said negative power source and said junction point in order to offset the current flowing between said positive power source and said junction point.

22. An electronic system for process instrumentation and control according to claim 14, in which a pseudo resistor is inserted between said negative power source and said junction point in order to offset the current flowing between said positive power source and said junction point.

23. An electronic system for process instrumentation and control according to claim 15, in which a pseudo resistor is inserted between said negative power source and said junction point in order to offset the current flowing between said positive power source and said junction point.

24. An electronic system for process instrumentation and control according to claim 16, in which a pseudo resistor is inserted between said negative power source and said junction point in order to offset the current flowing between said positive power source and said junction point.

25. An electronic system for process instrumentation and control according to claim 2, further comprising an output signal converter for delivering process output signals to an actuator upon receipt of the uniform electrical signals from said at least one input signal converter.

26. An electronic system for process instrumentation and control according to claim 4, further comprising an output signal converter for delivering process output signals to an actuator upon receipt of the uniform electrical signals from said at least one input signal converter.

27. An electronic system for process instrumentation and control according to claim 7, further comprising an output signal converter for delivering process output signals to an actuator upon receipt of the uniform electrical signals from said at least one input signal converter.

28. An electronic system for process instrumentation and control according to claim 8, further comprising an output signal converter for delivering process output signals to an actuator upon receipt of the uniform electrical signals from said at least one input signal converter.

29. An electronic system for process instrumentation and control according to claim 9, further comprising an output signal converter for delivering process output signals to an actuator upon receipt of the uniform electrical signals from said at least one input signal converter.

30. An electronic system for process instrumentation and control according to claim 10, further comprising an output signal converter for delivering process output signals to an actuator upon receipt of the uniform electrical signals from said at least one input signal converter.

31. An electronic system for process instrumentation and control according to claim 13, further comprising an output signal converter for delivering process output signals to an actuator upon receipt of the uniform electrical signals from said at least one input signal converter.

32. An electronic system for process instrumentation and control according to claim 14, further comprising an output signal converter for delivering process output signals to an actuator upon receipt of the uniform electrical signals from said at least one input signal converter.

33. An electronic system for process instrumentation and control according to claim 15, further comprising an output signal converter for delivering process output signals to an actuator upon receipt of the uniform electrical signals from said at least one input signal converter.

34. An electronic system for process instrumentation and control according to claim 16, further comprising an output signal converter for delivering process output signals to an actuator upon receipt of the uniform electrical signals from said at least one input signal converter.

35. An electronic system for process instrumentation and control according to claim 18, further comprising an output signal converter for delivering process output signals to an actuator upon receipt of the uniform electrical signals from said at least one input signal converter.

36. An electronic system for process instrumentation and control according to claim 21, further comprising an output signal converter for delivering process output signals to an actuator upon receipt of the uniform electrical signals from said at least one input signal converter.

37. An electronic system for process instrumentation and control according to claim 22, further comprising an output signal converter for delivering process output signals to an actuator upon receipt of the uniform electrical signals from said at least one input signal converter.

38. An electronic system for process instrumentation and control according to claim 23, further comprising an output signal converter for delivering process output signals to an actuator upon receipt of the uniform electrical signal from said at least one input signal converter.

39. An electronic system for process instrumentation and control according to claim 24, further comprising an output signal converter for delivering process output signals to an actuator upon receipt of the uniform electrical signals from said at least one input signal converter.

* * * * *